Nov. 7, 1967 E. M. JOST 3,351,439

ELECTRODES

Filed Oct. 24, 1965

Ernest M. Jost,
Inventor.
Koenig, Senniger, Powers and Leavitt,
Attorneys.

United States Patent Office 3,351,439
Patented Nov. 7, 1967

3,351,439
ELECTRODES
Ernest M. Jost, Attleboro, Mass., assignor to Texas Instruments Incorporated, Dallas, Tex., a corporation of Delaware
Filed Oct. 24, 1965, Ser. No. 504,340
3 Claims. (Cl. 29—182.2)

ABSTRACT OF THE DISCLOSURE

An electrode of the plaque type for batteries, fuel cells and the like is made by sintering a highly porous mass of loose nickel flakes to form welds at spots between the flakes thereby forming a highly porous structure. According to one form of the invention, this is impregnated with a liquid suspension of fine Raney nickel-powder particles. Raney nickel is an alloy of nickel and aluminum. The impregnated structure is then dried and further sintered to weld the fine Raney nickel particles to the nickel flakes. The resulting skeleton structure is immersed in hot sodium hydroxide to leach out the aluminum from the Raney nickel alloy particles, thus leaving welded to the flakes small nickel particles of sub-micron size. During the process, either before the impregnating step or after the leaching step, the structure is compressed. As a result, some, but not all, of the welded nickel flakes form tabularly shaped pores, thereby to obtain a good pore-size distribution in the plaque.

A second form of the invention is like the first form in that a sintered, nickel-flake skeleton is constructed. This is impregnated with nickel hydroxide and then subjected to a hot reducing atmosphere containing hydrogen to produce fine nickel particles of sub-micron size welded to the plate. The resulting water is evaporated. During the process either before impregnation or after conversion of the nickel hydroxide to nickel particles on the flakes, the skeleton is compressed, as in the first form of the invention.

A third form of the invention is like the first and second forms in that a sintered, nickel-flake skeleton is constructed. This skeleton is compressed and then immersed in a nickel-plating solution with application of a high current density so as to plate finely divided particles in the form of nickel dendrites on the nickel flakes.

---

Among the several objects of the invention may be noted the provision of electrodes of the plaque type having much larger surface areas for greater catalytic activity than were heretofore available; the provision of nickel electrodes of the class described having optimum pore size and improved pore-size distribution obtainable by convenient manufacturing steps; and the provision of light-weight and compact electrodes of this class for use in making light-weight, compact high-capacity batteries, fuel cells and the like. Other objects and features will be in part apparent and in part pointed out hereinafter.

The invention accordingly comprises the products and methods hereinafter described, the scope of the invention being indicated in the following claims.

In the accompanying drawings, in which several of various possible embodiments of the invention are illustrated, FIG. 1 is a diagrammatic cross section illustrating a step used in constructing a first embodiment of the invention;

Corresponding reference characters indicate corresponding parts throughout the several views of the drawings.

Presently known plaque-type electrodes composed of nickel in particulate form such as carbonyl-nickel powder or nickel flakes have surface areas of a few hundred to a few thousand square centimeters per gram. Such areas are too small to provide the high catalytic activity desired, which requires several tens of thousands of square centimeters per gram. The surface areas are insufficient because of the comparatively large sizes of the powder particles and flakes. Thus carbonyl-nickel powder has grain sizes of greater than a micron and the conventional flakes are on the order of .00004 inch thick and about .004 square inch in area. The apparent density of nickel flakes is smaller than one tenth of a gram per cubic centimeter.

Fine powders which have high surface areas, such as Raney nickel powders which have grains of sub-micron size, have been suggested. Raney nickel designates a series of alloys of nickel and aluminum. This powder also is not suitable when used along because of handling difficulties during fabrication, inferior pore-size distribution, and a tendency to lose catalytic activity with the heat treatment employed during manufacture.

It has been suggested to use so-called double-skeleton electrodes. These are composed, for example, of both the coarser carbonyl-nickel powder and the finer Raney nickel powder. While such electrodes have some advantages, they are not ideal, again because of handling difficulties and the fact that they require a considerable amount of the comparatively large-grained carbonyl-nickel powder, which acts as an undesirable dead weight. Moreover, the pores are small than desirable.

Figure 1:
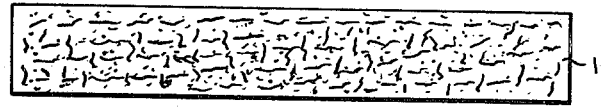

According to a first form of my invention, a highly porous mass of loose conventional nickel flakes are sintered in a suitable mold at, say, 1000° C. for several hours. The mold may be in the form of a conventional flat rectangular carbon dish, for example. Little or no compaction is applied to the flakes in the mold before they are sintered therein. The resulting sinter-welded mass after removal from the mold is self-supporting. The porosity of this sintered mass is as high as approximately 99%. Its general shape may be flat, such as suggested by the cross section shown in FIG. 1. Other shapes are not precluded. The removed sintered mass is then impregnated, by dipping or the like, with a suitable liquid suspension of fine Raney nickel-powder particles. The suspension may for example be a mixture of 500 grams of Raney nickel powder with 400 ml. of a 2% aqueous solution polyethylene oxide or polyvinyl alcohols. The liquid-impregnated structure is then dried. The result is a substantially even distribution of the very fine Raney nickel particles deposited on the surfaces of the sintered or sinter-welded nickel flakes. Thereafter the dried structure is sintered, again for example at 1000° C. for several hours, so that the Raney nickel particles become welded to the nickel flakes. At this stage the mass of nickel flakes is in the nature of a skeleton forming a thick, low-density plaque carrying in its pores the Raney nickel particles sintered to the internal surfaces of the flakes. The result is as illustrated in FIG. 1, in which numeral 1 indicates the low-density, highly porous, impregnated, dried and sintered comparatively thick plaque which is self-supporting and of comparatively large volume. The short curved lines represent the porous nickel flakes, which constitute a plaque-forming skeleton formed by the sintered nickel flakes. The dots indicate the particles of Raney nickel powder sintered on the flakes within the pores.

Figure 2:
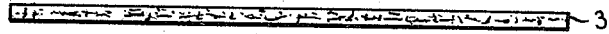
FIG. 2 is a view similar to FIG. 1, illustrating subsequent steps used in constructing the first embodiment.

Next, as shown in FIG. 2, the plaque is compressed to a smaller volume of desired thickness or shape, the particle-carrying flakes being pressed together. This improves the pore shapes and their distribution. Any conventional pressing means may be employed such as a platen (not shown). The compressed plaque is numbered 3 in FIG. 2. Its thickness may be about one-fifth of that shown in FIG. 1, but this is subject to variation. At this stage the porosity may still be as high as approximately 85%. In FIG. 2 the short curved lines represent the nickel flakes and the dots indicate the Raney nickel powder welded to the flakes in the pores, except that in this case the plaque is somewhat more densely compacted and of less volume. However, its porosity is still considerable. Thus at the stage of FIG. 2, the particles of this Raney nickel alloy are substantially evenly distributed in particulate form and in welded attachment to the nickel flakes in their configurations as compressed.

Next the pressed structure shown in FIG. 2 is immersed in hot sodium hydroxide (NaOH) or potassium hydroxide (KOH) whereby the aluminum is leached out of the Raney nickel alloy, leaving extremely small particles of nickel (Ni) attached to the nickel flakes, the conversion from Raney nickel alloy to Ni being accomplished in situ on the nickel flakes. As a result, each nickel flake 5 (several of which are diagrammatically shown in cross section in FIG. 3 on a greatly enlarged scale) has attached or welded to its surfaces exceedingly fine particles of nickel, numbered 7. These leached nickel particles are very small, being mostly of submicron size. The very small particles 7 are in permanent attachment to their supporting nickel flakes and are well distributed in a good pore distribution. The pores are suggested at numeral 9 in FIG. 3. The resulting surface area for catalytic activity provided by the very fine, well-distributed, welded nickel particles carried by the plaque-forming welded flakes is of the order of several tens to approximately two-hundred square meters per gram weight of finished electrode material. The catalytic activity of the finished electrode is extremely high when used, for example, in the electrolyte of a battery or a fuel cell.

It will be understood that the compression step alternatively may be placed ahead of the step of dipping into the Raney nickel suspension or after the leaching step.

Figure 4:
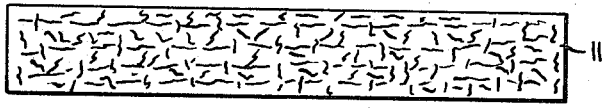
FIGS. 4 and 5 are views similar to FIGS. 1 and 2, respectively, illustrating a second embodiment of the invention.
Figure 5:
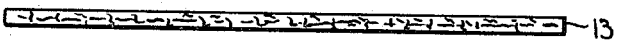

Another form of the invention is as follows. A highly porous nickel-flake sintered plaque is prepared in thick form as above described, with the result as illustrated at 11 in FIG. 4. Again this is then compressed as above described and as illustrated in FIG. 5. The compressed nickel-flake plaque is then impregnated with nickel hydroxide $Ni(OH)_2$ as by dipping or the like so that after drainage of excess liquid, the surfaces of the flakes are wet with the nickel hydroxide. The wet plaque is then placed in a hot reducing atmosphere containing hydrogen. By this means the nickel hydroxide is converted to extremely fine particles of nickel attached or welded to the plate, along with the production of water, which evaporates. The reaction formula is $$Ni(OH)_2 + H_2 \rightarrow Ni + 2H_2O$$

It is possible to use a temperature as high as on the order of 750° C. but this depends upon the wetness or dryness of the hydrogen atmosphere. If the pressure of the oxygen contained in the water is, for example, $3 \times 10^{-9}$ mm. of mercury, an appropriate temperature to be used during reduction may be on the order of 300° C. This corresponds to a dewpoint of −50° C. Other values may be used, depending upon the speed of reaction desired. For example, a lower temperature such as 200° C. may be used if the reducing hydrogen atmosphere is dry enough.

After drying, the resulting porous nickel plaque with the fine nickel particles bonded to the flakes in the pores is pressed to decrease the bulk volume, as illustrated at 13 in FIG. 5. A 5:1 thickness ratio may again be employed. An enlarged section of FIG. 5 will appear much like the section diagrammed in FIG. 3, the only difference being in how the nickel particles 7 have been produced in situ on the sintered nickel flakes. Again they are mostly of submicron size and are metallurgically bonded in particulate form to the flakes.

It will be understood that compression may precede rather than follow the impregnation and reduction steps, if desired.

Figure 6:
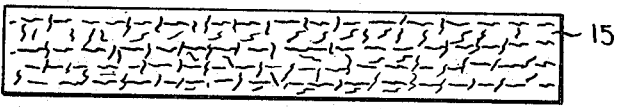
FIGS. 6 and 7 are similar to FIGS. 1 and 2, respectively, illustrating a third embodiment of the invention.
Figure 7:
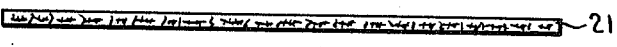
Figure 8:
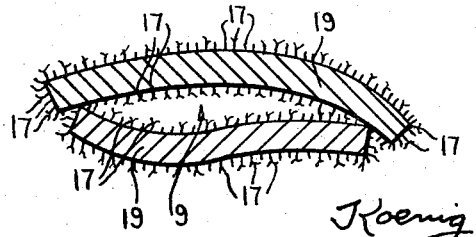
FIG. 8 is a greatly enlarged fragmentary sectional detail of certain nickel flakes with nickel dendrites electroplated thereon.

The third form of the invention is illustrated in FIGS. 6, 7 and 8. In this case a highly porous sintered nickel-flake plaque is prepared as above described and as illustrated at 15 in FIG. 6. It is then compressed as illustrated at 21 in FIG. 7, at, say, a 5:1 ratio. It is then immersed in a conventional nickel-plating bath at a high current denisty, so as to plate finely divided particles in the form of nickel dendrites 17 on the nickel flakes 19 (FIG. 8). A current density of 1 amp. per sq. cm. is satisfactory. Since appropriate nickel-plating baths are well known to those skilled in the art, further description in this regard will be unnecessary. While the dendrites are not of submicron size in the sense that particles 7 are, nevertheless they have very high surface areas because of their thin filamentary character. In this form of the invention compression preferably precedes plating so as to avoid crushing of plated dendrites, but it will be understood that this order may be reversed and most of the advantages of the invention retained.

According to all three forms of the invention above described, there will be produced a compact sintered nickel-flake skeleton having internal pore surfaces covered with metallurgically bonded very finely divided nickel particles having extensive surface areas. The pores combine favorable sizes and distribution in the plaque.

Figure 3:
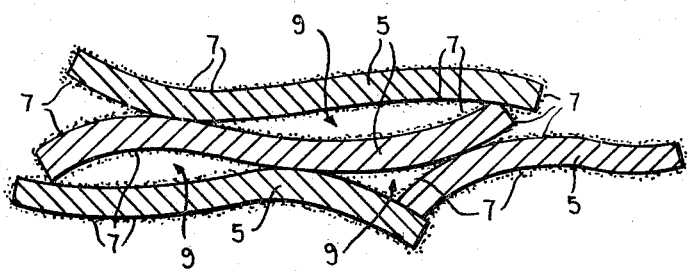
FIG. 3 is a greatly enlarged fragmentary sectional detail illustrating certain nickel flakes with finely divided nickel particles welded thereto.

It will be seen from FIGS. 3 and 8 that some, though not all of the nickel flakes 5, in view of the leaf-like shapes, tend to become oriented somewhat flatwise relative to one another, which produces favorable elongate or tabular shapes of some of the pores 9. This, along with the fact that some of the pores will have other shapes, forms a good pore-size distribution and consequently a good distribution of the nickel particles metallurgically bonded to their inner surfaces. Moreover, because of the metallurgical bonding, these distributions remain permanently throughout the life of the electrode when in use.

In view of the above, it will be seen that the several objects of the invention are achieved and other advantageous results attained.

As various changes could be made in the above products and methods without departing from the scope of the invention, it is intended that all matter contained in the above description or shown in the accompanying drawings shall be interpreted as illustrative and not in a limiting sense.

What is claimed is:

1. A porous electrode comprising a mass of nickel flakes, permanent metallic connections between points of contact of the flakes to form a skeleton, the mass of connected flakes being in the form of a plaque, nickel particles distributed substantially over the surfaces of the connected flakes, metallic connections between said particles and the surfaces of said flakes, some of the connected flakes being located to form between them a substantial number of tabularly shaped pores, the pore volumes between other connected flakes being of other than tabular shapes, thereby to effect a good pore-size distribution in the plaque.

2. A porous electrode according to claim 1 wherein said particles are in the form of nickel dendrites.

3. A porous electrode comprising a mass of nickel flakes, welds between points of contact between the flakes to form a skeleton, the mass of welded flakes being in the form of a plaque, nickel particles substantially on all of which are of sub-micron size, said particles being distributed over substantially the entire surfaces of the welded flakes, welds between said particles and said surfaces, some of the welded flakes being located flat-wise relative to one another to form substantially tabularly shaped pores between them, the pores between other welded flakes having other shapes to effect a good pore-size distribution in the plaque.

References Cited

UNITED STATES PATENTS

| | | | |
|---|---|---|---|
| 2,180,988 | 11/1939 | Lemmers | 75—222 X |
| 2,389,060 | 11/1945 | Kurtz | 75—222 X |
| 2,627,531 | 2/1953 | Vogt. | |
| 2,700,062 | 1/1955 | Schlecht | 75—222 X |
| 3,073,697 | 1/1963 | Friese | 29—182.2 X |
| 3,150,011 | 9/1964 | Winsel | 75—208 X |
| 3,214,355 | 10/1965 | Kandler | 136—120 X |

FOREIGN PATENTS

| | | |
|---|---|---|
| 540,447 | 5/1957 | Canada. |
| 1,116,287 | 11/1961 | Germany. |
| 868,837 | 5/1961 | Great Britain. |
| 999,361 | 5/1961 | Great Britain. |

BENJAMIN R. PADGETT, *Primary Examiner.*

A. J. STEINER, *Assistant Examiner.*